United States Patent
Tsirkin et al.

(10) Patent No.: US 9,575,787 B2
(45) Date of Patent: Feb. 21, 2017

(54) MANAGING DEVICE ACCESS USING AN ADDRESS HINT

(75) Inventors: Michael Tsirkin, Yokneam Yillit (IL); Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 405 days.

(21) Appl. No.: 13/483,744

(22) Filed: May 30, 2012

(65) Prior Publication Data

US 2013/0326504 A1 Dec. 5, 2013

(51) Int. Cl.
*G06F 9/455* (2006.01)

(52) U.S. Cl.
CPC .................. *G06F 9/45558* (2013.01)

(58) Field of Classification Search
CPC .............. G06F 9/455; G06F 9/45558
USPC ................................. 718/1, 104
See application file for complete search history.

(56) References Cited

U.S. PATENT DOCUMENTS

| | | | | |
|---|---|---|---|---|
| 5,802,590 A * | 9/1998 | Draves | | 711/164 |
| 6,535,867 B1 * | 3/2003 | Waters | | |
| 7,089,211 B1 * | 8/2006 | Trostle et al. | | 705/51 |
| 7,853,947 B2 * | 12/2010 | Laborczfalvi et al. | | 718/1 |
| 8,037,280 B2 * | 10/2011 | Pandey et al. | | 711/206 |
| 8,171,075 B2 * | 5/2012 | Wedlake | G06F 9/5011 | 709/203 |
| 8,336,047 B2 * | 12/2012 | Van Hensbergen | G06F 9/5072 | 709/226 |
| 8,943,550 B2 * | 1/2015 | Krsti | G06F 21/53 | 713/193 |
| 2003/0187908 A1 * | 10/2003 | Boucher | | 709/103 |
| 2004/0098724 A1 * | 5/2004 | Demsey et al. | | 718/104 |
| 2006/0117257 A1 * | 6/2006 | Hasson et al. | | 715/535 |
| 2007/0104326 A1 * | 5/2007 | Feigenbaum | G06F 21/6227 | 380/44 |
| 2009/0106764 A1 * | 4/2009 | Klementiev et al. | | 718/104 |
| 2009/0288093 A1 * | 11/2009 | Thurgood et al. | | 718/104 |
| 2010/0146620 A1 * | 6/2010 | Simeral et al. | | 726/21 |

OTHER PUBLICATIONS

Davies, N., et al. "Object Invocation and Management in Distributed Multimedia Systems", Technical Report MPG-92-09, Department of Computing, Lancaster University, 1992. pp. 1-11.*
Disclosed Anoniymously "Address Translation Hash Table", IP.com Prior Art Database Tecnical Disclousre, Dec. 17, 2003.*

* cited by examiner

*Primary Examiner* — Abdullah Al Kawsar
*Assistant Examiner* — Willy W Huaracha
(74) *Attorney, Agent, or Firm* — Lowenstein Sandler LLP

(57) ABSTRACT

Methods and systems for managing requests for access to devices managed by a hypervisor in virtualized computing environment. A hypervisor receives a request for access to a device from a guest. The hypervisor provides an address hint associated with the device to the guest and an association between the address hint and the device is stored in a reference table. Upon receipt of a subsequent request from the guest including the address hint, the hypervisor performs a look-up in the reference table based on the address hint to identify the device and establishes access to the device by the guest.

27 Claims, 5 Drawing Sheets

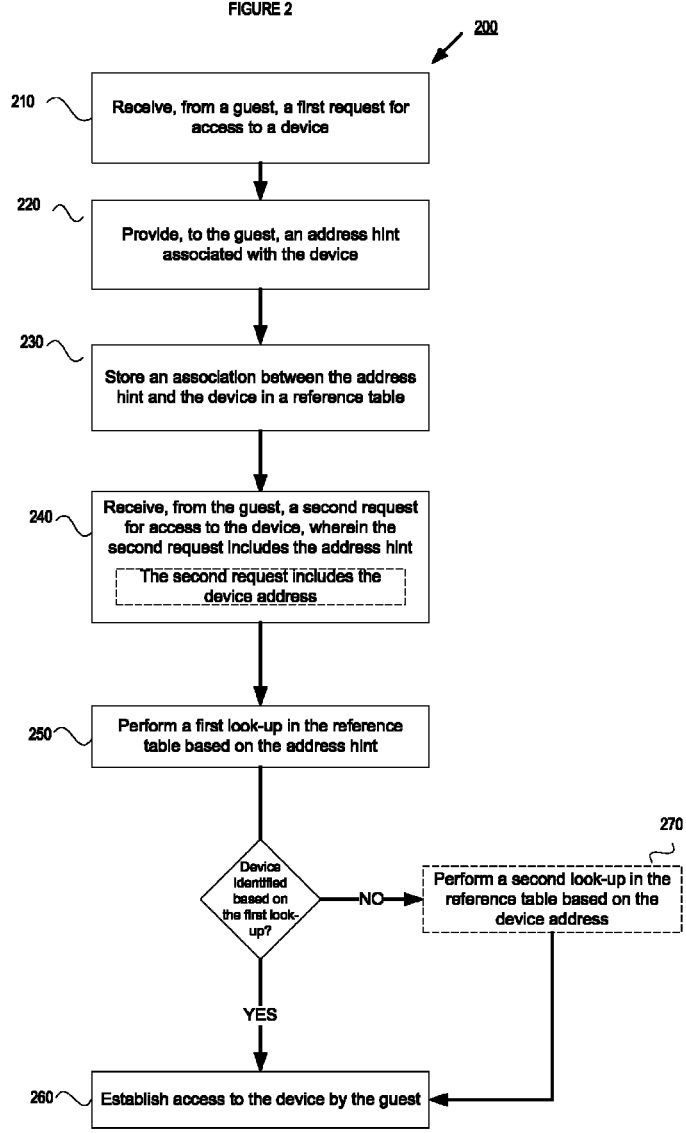

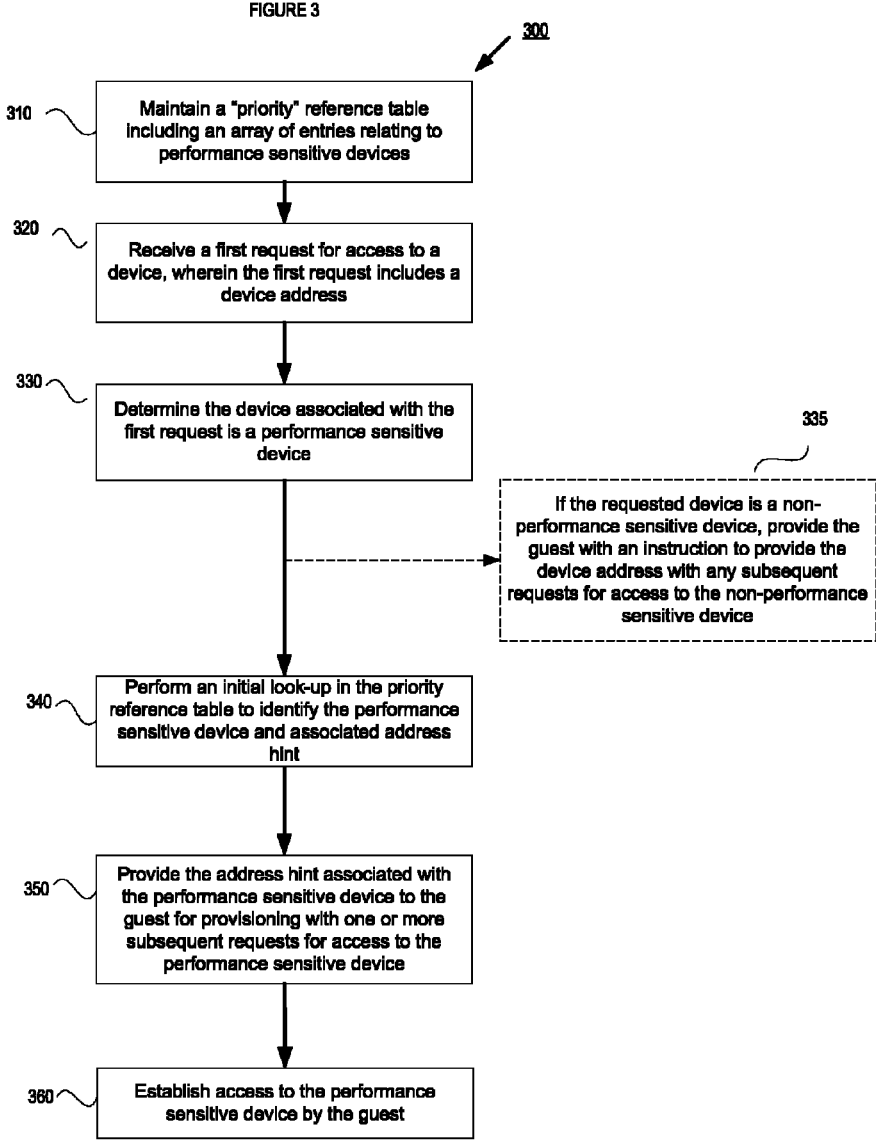

FIGURE 4A

| REFERENCE TABLE | | |
|---|---|---|
| ADDRESS | DEVICE NAME/ID | ADDRESS HINT |
| http://12X.0.0.1:123/printer | Printer 123 | P6 |
| http://12Y.0.0.1:456/display | Display 456 | D15 |
| http://12Z.0.4.9:789/PCIdevice | PCI 12Z-789 | PCI26 |

FIGURE 4B

| PRIORITY REFERENCE TABLE | | |
|---|---|---|
| PERFORMANCE SENSITIVE DEVICE ADDRESS | DEVICE NAME/ID | ADDRESS HINT |
| http://12A.0.0.1:ABC/PSD1 | PSD1 | Index value 1 |
| http://12B.0.0.2:DEF/PSD2 | PSD2 | Index value 2 |
| http://12C.0.0.3:GHI/PSD3 | PSD3 | Index value 3 |

MANAGING DEVICE ACCESS USING AN ADDRESS HINT

TECHNICAL FIELD

Embodiments of the present invention relate to a computer system, and more specifically, to management of device access in a virtualized computing environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) or hypervisor manages allocation and virtualization of computer resources, such as physical and virtual devices.

Frequently, a guest running on a virtual machine requires access to a device managed by the hypervisor. To gain the desired access, the guest specifies to the hypervisor which virtual or physical device or device function it wishes to access (i.e., the desired device) by providing a request for access to the device including address information associated with the desired device. Upon receipt of the device access request, the hypervisor decodes the device address information provided in the request in order to identify the desired device.

One conventional method for assigning and managing the device addresses associated with the multiple devices managed by a hypervisor involves a static assignment by the hypervisor of a fixed address to a particular device. However, this approach is inflexible, particularly when adding or removing devices from the system. Furthermore, this approach requires the hypervisor to maintain state information associated with the device in order to properly manage the access requests received from the guest. Maintenance of the device state information places an additional burden on the hypervisor, such as, for example, requiring the transfer of the maintained state information during the migration of a virtual machine (and guest) from one hypervisor to another.

Another conventional approach to device address assignment is for the guest to dynamically assign an address to the desired device. According to this approach, the guest sets the device address by an instruction that is trapped by the hypervisor. Then, a follow-up instruction from the guest includes the device address, which is used by the hypervisor to identify the desired device. Although this approach provides the guest with flexibility, by giving the guest the ability to designate a device address, the hypervisor is forced to manage device addresses having a variety of data structures (e.g., device addresses having a wide range of different data structure forms and formats). Due to the lack of uniformity in dynamic guest-assigned device addresses, device look-up and identification is an inefficient and time-consuming process.

BRIEF DESCRIPTION OF THE DRAWINGS

FIG. 2 is a flow diagram of one embodiment of a method for managing device address assignment and device access in a virtual computing environment, according to one embodiment of the invention.

FIG. 3 is a flow diagram of one embodiment of a method for managing device address assignment and device access in a virtual computing environment, according to one embodiment of the invention.

FIGS. 4A and 4B illustrate exemplary reference tables for use in managing device access in a virtual computing environment, according to embodiments of the present invention.

DETAILED DESCRIPTION

Figure 1:
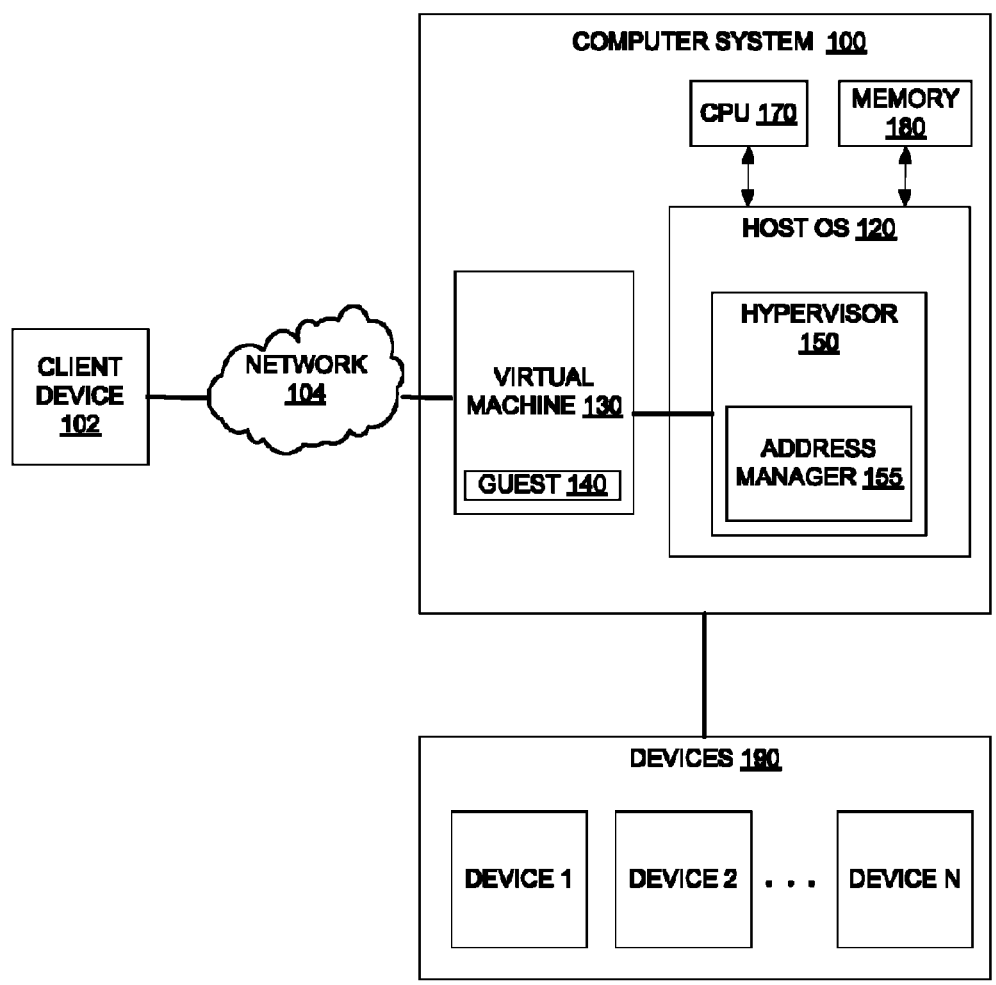
FIG. 1 is a block diagram of an exemplary virtual machine system illustrating a device access management environment, according to one embodiment of the invention.

Methods and systems for managing access by one or more guests operating on a virtual machine to devices managed by a hypervisor in a virtual computing environment. In an embodiment, the hypervisor includes an address manager configured to provide an address hint associated with a device to a guest in response to receipt of a request for access to the device (also referred to as the "desired device"). An association between the address hint and the device is stored in a reference table.

In an embodiment, the guest provides the address hint with subsequent requests for access to the device. In response, the address manager performs a look-up in the reference table using the address hint to identify the associated device and establish the requested access upon identification of the device.

In an embodiment, one or more particular devices or device types may be identified as a "performance sensitive device" and included in a priority reference table. A performance sensitive device may be any device for which a prioritized look-up is desired. For example, a performance sensitive device may include a device configured to perform time-sensitive tasks and/or actions. In an embodiment, the priority reference table may include an array of index values, wherein the index values represent the address hint. Advantageously, use of the array of index values in association with performance sensitive devices enables the address manager to perform fast and efficient look-ups for priority devices. In an embodiment, a device may be designated as a performance sensitive device based on rules and/or conditions maintained by the hypervisor or via a designation submitted by an administrator managing the hypervisor.

In an embodiment, non-performance sensitive devices including a device for which a priority look-up is not desired (e.g., a keyboard) are excluded from the priority reference table. In this embodiment, non-performance sensitive devices are identified by the address manager by a look-up using a separate reference table (e.g., a non-priority reference table) based on a device address provided by the guest with the request for access.

In an embodiment, an initial request for access to a device received from guest includes a device address. In response to the initial request, the address manager provides the guest with an address hint associated with the device and establishes the requested access based on a look-up in the reference table using the device address. A second access request received from the guest includes the provided address hint, which is used by the address manager to perform a fast or expedited look-up in the reference table for the desired device.

Throughout the following description, the term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Accordingly, an efficient method and system is provided that optimizes a hypervisor's management of access to a device by a guest in a virtual machine computing system. In embodiments of the present invention, the hypervisor is configured to associate an address hint with a device in a reference table and provide the address hint to a guest in response to an initial request for access to a device. In addition, the hypervisor is configured to perform look-ups in the reference table to identify a device based on the address hint received from a guest in subsequent requests for access to the device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system 100 in which embodiments of the present invention may operate. Although the computer system 100 may host multiple virtual machines (VM), a single virtual machine 130 is shown in FIG. 1 for purposes of illustration. The virtual machine 130 runs a guest (e.g., guest 140) that uses a guest operating system to manage its resources. The guest 140 may represent a client device 102 that accesses the computer system 100 via a network 104. In one embodiment, the computer system 100 is accessible by multiple remote systems via the network 104, which may be a private network (e.g., a local area network (LAN), a wide area network (WAN), intranet, etc.) or a public network (e.g., the Internet). The virtual machine 130 may run the same or different guest operating system, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 150 to virtualize access to devices 190 (e.g., Device 1, Device 2, . . . Device N) managed by the computer system 100, making the use of the virtual machine 130 transparent to the guest 140 and the users of the computer system 100. As shown in FIG. 1, access by the virtual machine 130 running the guest 140 to the devices 190 is managed by the hypervisor 150. It should be noted that the devices 190 may be any physical or virtual device, such as, for example, a video display (e.g., a video graphics array (VGA)), a keyboard, a printer, a network component, and a peripheral component interconnect (PCI) device.

According to embodiments of the present invention, the computer system 100 may also include hardware components such as one or more physical central processing units (CPUs) 170, memory 180, and other hardware components. In one embodiment, the hypervisor 150 includes an address manager 155. The address manager 155 is a component (i.e., a set of instructions executable by a processing device of the computer system 100, such as CPU 170) configured to perform the actions described in detail below with regard to FIGS. 2-4. Although shown as a discrete component of the hypervisor 150, it is noted that the address manager may be a separate component externally coupled to the hypervisor 150.

In an embodiment, the address manager 155 may be configured to maintain and perform look-ups in a reference table including an association between a device identifier, an address hint, and an address for each of the devices 190. According to embodiments of the present invention, the access manager 155 is configured to receive requests for access to one or more of the devices 190 and perform a look-up in the reference table to identify the desired device based on the address hint, as described below in detail with regard to FIGS. 2 and 3. Exemplary reference tables are described below in connection with FIGS. 4A and 4B. In an embodiment, the reference table may be stored in any data store accessible by the address manager 155, such as, for example, memory 180. In an embodiment, the address manager 155 may be configured to discard the reference table in the event of a migration of the virtual machine 130 (and associated guest 140) from the hypervisor 150 to another hypervisor (not shown).

FIG. 2 is a flow diagram illustrating one embodiment of a method 200 for managing access of a guest on a virtual machine (e.g., guest 140 on virtual machine 130 in FIG. 1) to a device (e.g., devices 190 of FIG. 1). The method 200 may be performed by a computer system (e.g., computer system 100 of FIG. 1 or computer system 500 of FIG. 5) comprising hardware (e.g., circuitry, dedicated logic, programmable logic, microcode, etc.), software (e.g., instructions run on a processing device), or a combination thereof. In one embodiment, the method 200 is performed by the address manager 155 of the hypervisor 150 of FIG. 1.

Referring to FIG. 2, in one embodiment, the method 200 begins when an initial request for access to a device is received from a guest, in block 210. The initial request for access (also referred to as a "first request for access") may include a device address associated with the device to which access is desired (e.g., also referred to as the "desired device"). It is noted that the device address provided with the initial request for access may be in any suitable data structure form and/or format. The request for access may include an instruction from the guest requesting use of functionality provided by the desired device.

In response to receipt of the initial request, the hypervisor provides the guest with an address hint associated with the desired device, in block 220. According to embodiments of the present invention, the address hint may be any identifier configured to uniquely identify a particular device. For example, the address hint may be an index value, an alphanumeric string of characters based on the name or type of the associated device, and/or a randomly generated string of characters. It is noted that the address hint may be in any suitable form or format and may be generated in any suitable manner. In an embodiment, the hypervisor may provide the guest with the address hint by placing the address hint in a location that is accessible by the guest, such as, for example, the CPU register or a memory location accessible by the guest.

According to embodiments of the present invention, an association or mapping between the address hint, the desired device, and the device address is stored for each of the devices managed by the hypervisor (e.g., devices 190 in FIG. 1) in the reference table, in block 230. In an embodiment, the hypervisor may maintain a reference table including a list of the devices maintained by the hypervisor (e.g., without an associated address hint). In this embodiment, the address hint may be dynamically generated by the hypervisor upon receipt of the initial request from the guest, and the association between the address hint and the device may be stored in the reference table.

In an embodiment, the hypervisor may store the association between the address hint and the device in the reference table prior to the receipt of the first request from the guest for access to the device, retrieve the stored address hint in response to the first request, and provide the retrieved address hint to the guest (in block 220).

In this regard, it is noted that storing the association between the address hint and the device in the reference table, in block 240, may occur either before or after receiving the first request for access to the device, in block 210.

In block 240, the hypervisor receives, from the guest, a second request for access to the device (also referred to generally as a "subsequent request"). In an embodiment, the second request for access to the device includes the address hint provided to the guest in block 220. Optionally (as denoted by the dashed box in FIG. 2), the second request may include the device address.

In block 250, the hypervisor performs a look-up in the reference table based on the address hint (also referred to as a "first look-up") in order to identify the associated device to which accesses is being requested by the guest. If a device associated with the address hint is identified, the hypervisor establishes access to the identified device by the guest, in block 260. It is noted that the first look-up may be referred to as a "fast look-up" since it is advantageously based on the address hint, and not based on a device address, which may have a non-uniform data structure.

In an embodiment, if a device is not identified based on the first look-up (e.g., a look-up based on the address hint), and the second request included the device address in block 240, then the hypervisor performs a second look-up in the reference table based on the device address. In this embodiment, the hypervisor may establish access to the device by the guest (in block 260) following identification of the desired device based on the device address look-up in the reference table.

In an embodiment, in response to the second request for access, the hypervisor may provide the guest with the address hint for use in subsequent requests for access. In another embodiment, the hypervisor may provide an updated address hint in response to the second request. For example, if the initial look-up fails, the hypervisor may store an association with the updated address hint in the reference table and provide the updated address hint to the guest for use in subsequent access requests.

It should be noted that the source hypervisor may execute multiple virtual machines and, as such, the method 200 would be performed with respect to the multiple virtual machines. For purposes of illustration, method 200 is described with reference to an exemplary migration of a single virtual machine from a source hypervisor to a destination hypervisor.

As shown in the exemplary reference table of FIG. 4A, the hypervisor may store information relating to the devices, including, but not limited to, a device address, a device name or identifier (e.g., serial number, model name/number), and an address hint associated with each of the devices managed by the hypervisor. In an embodiment, the reference table in FIG. 4A may be maintained in a database stored in a memory accessible by the hypervisor, such as, for example, memory 180 shown in FIG. 1. The hypervisor may track and record entries in the reference table in any suitable format (e.g., tabular form) and may include entries having any suitable information to enable look-up based on the address hint and/or the device address to identify the desired device.

In an embodiment wherein the second request includes the device address, the hypervisor may be configured to discard the reference table at the time of a migration of the virtual machine/guest to a new hypervisor. Advantageously, the reference table may be discarded (e.g., to conserve memory resources) according to an embodiment of the present invention since the state of the device is not maintained by the reference table in view of the use of the address hint.

FIG. 3 is a flow diagram illustrating one embodiment of a method 300 for managing access of a guest on a virtual machine (e.g., guest 140 on virtual machine 130 in FIG. 1) to a performance sensitive device (e.g., devices 190 of FIG. 1). The method 300 may be performed by a computer system (e.g., computer system 100 of FIG. 1 or computer system 500 of FIG. 5) comprising hardware (e.g., circuitry, dedicated logic, programmable logic, microcode, etc.), software (e.g., instructions run on a processing device), or a combination thereof. In one embodiment, the method 300 is performed by the address manager 155 of the hypervisor 150 of FIG. 1.

Referring to FIG. 3, in one embodiment, the method 300 includes maintaining a priority look-up table including an array of entries relating to performance sensitive devices, in block 310. According to embodiments of the present invention, the priority reference table enables the hypervisor to perform a "fast look-up" in the priority reference table for those devices that are performance sensitive, to enable an overall faster establishment of access to performance sensitive devices. In an embodiment, one or more particular devices or device types may be identified as a "performance sensitive device" and included in a priority reference table. A performance sensitive device may be any device for which a prioritized look-up is desired. For example, a performance sensitive device may include a device configured to perform time-sensitive tasks and/or actions and/or a latency sensitive device.

In an embodiment, the priority reference table may include an array of index values, wherein each index value represents an address hint associated with a particular performance sensitive device. Advantageously, use of the array of index values in association with performance sensitive devices enables the address manager to perform fast and efficient look-ups for priority devices. In an embodiment, a device may be designated as a performance sensitive device based on rules and/or conditions maintained by the hypervisor or via a designation submitted by an administrator managing the hypervisor.

In block 320, the hypervisor receives a first request for access to a device, wherein the first request includes a device address. Next, the hypervisor determines whether the desired device is a performance sensitive device having an entry in the priority reference table, in block 330. It is noted that the determination of whether the desired device is a performance sensitive device or a non-performance sensitive device may be based on any suitable rules or conditions applicable by the hypervisor, such as, for example, a rule which identifies performance sensitive devices based on the device type (e.g., Rule 1: all displays are performance sensitive devices; Rule 2: all keyboards are non-performance sensitive devices, etc.). It is further noted that the determination of whether the desired device is a performance sensitive device or a non-performance sensitive device may be based on a look-up in the priority reference table based on information relating to the desired device provided in the first request for access.

In an embodiment, the performance sensitive devices in the array of entries in the priority reference table may be high-speed devices, while low-speed devices and/or devices that are not latency sensitive are categorized as non-performance sensitive devices.

In an embodiment, the priority reference table (such as the priority reference table shown in FIG. 4B) may be used to assign preferred address hints (e.g., index values) to performance sensitive devices to enable an expedited look-up of those devices. In an embodiment, the one or more non-performance sensitive devices may be given a non-preferred address hint in the priority reference table (e.g., a non-index value) or not assigned an entry and an associated address hint in the priority table. For example, in an embodiment, the address hint may include an invalid value (e.g., an invalid hint), and the invalid value may be provided to the guest in response to a request for access to a non-performance sensitive device.

In another embodiment, a separate non-priority reference table may be maintained including entries associated with the non-performance sensitive devices. In this embodiment, fast look-ups may be performed by the hypervisor using the priority reference table, while slow (or relatively slower) look-ups are performed by the hypervisor using the non-priority reference table following the determination in block 330. In an embodiment, the optimal or preferred address hints (e.g., index values that would enable the fastest relative look-ups) may be reserved for performance sensitive devices.

Optionally, in block 335 (as denoted by the dashed box), if the requested device is a non-performance sensitive device, the hypervisor may provide the guest with an instruction to provide the device address with any subsequent requests for access to the non-performance sensitive device.

With reference to FIG. 3, in block 340, following determination that the desired device is a performance sensitive device, the hypervisor performs an initial look-up in the priority reference table to identify the desired performance sensitive device and the associated address hint (e.g., index value). In block 350, the hypervisor provides the address hint associated with the desired performance sensitive device to the guest for provisioning by the guest with one or more subsequent requests for access to the performance sensitive device. In block 360, the hypervisor may establish access, by the guest, to the performance sensitive device in response to any subsequent requests for access by identifying the desired device based on "fast" look-up in the priority reference table using the address hint (e.g., index value).

In an embodiment, in response to a request for access to a non-performance sensitive device, the hypervisor may provide an address hint which includes an instruction to the guest to include a device address with any subsequent requests for access to the non-performance sensitive device. In this embodiment, the address hint does not include a value, such as those maintained in the priority reference table, but instead includes the aforementioned instruction.

As shown in the exemplary reference table of FIG. 4B, the hypervisor may maintain a priority reference table including information relating to performance sensitive devices, including, but not limited to, a device address, a device name or identifier (e.g., serial number, model name/number), and a priority or preferred address hint (e.g., Index Value 1, Index Value 2, and Index Value 3) associated with each of the performance sensitive devices managed by the hypervisor. In an embodiment, the reference table in FIG. 4A may be maintained in a database stored in a memory accessible by the hypervisor, such as, for example, memory 180 shown in FIG. 1. One having ordinary skill in the art will appreciate that the hypervisor may track, record, and/or maintain entries in the reference table in any suitable format (e.g., tabular form) and may include entries having any suitable information to enable expedited look-up in the priority reference table based on the address hint and/or the device address to identify the desired performance sensitive device.

In an embodiment, a guest may have access to a location storing or maintaining multiple address hints associated with multiple devices for which the guest has previously requested access and previously been provided the address hint by the hypervisor. In generating a subsequent request for access, the guest may access the address hint location (e.g., a CPU register or data store location) and retrieve an appropriate address hint (e.g., the address hint associated with the desired device) for inclusion by the guest in the subsequent request.

Figure 5:
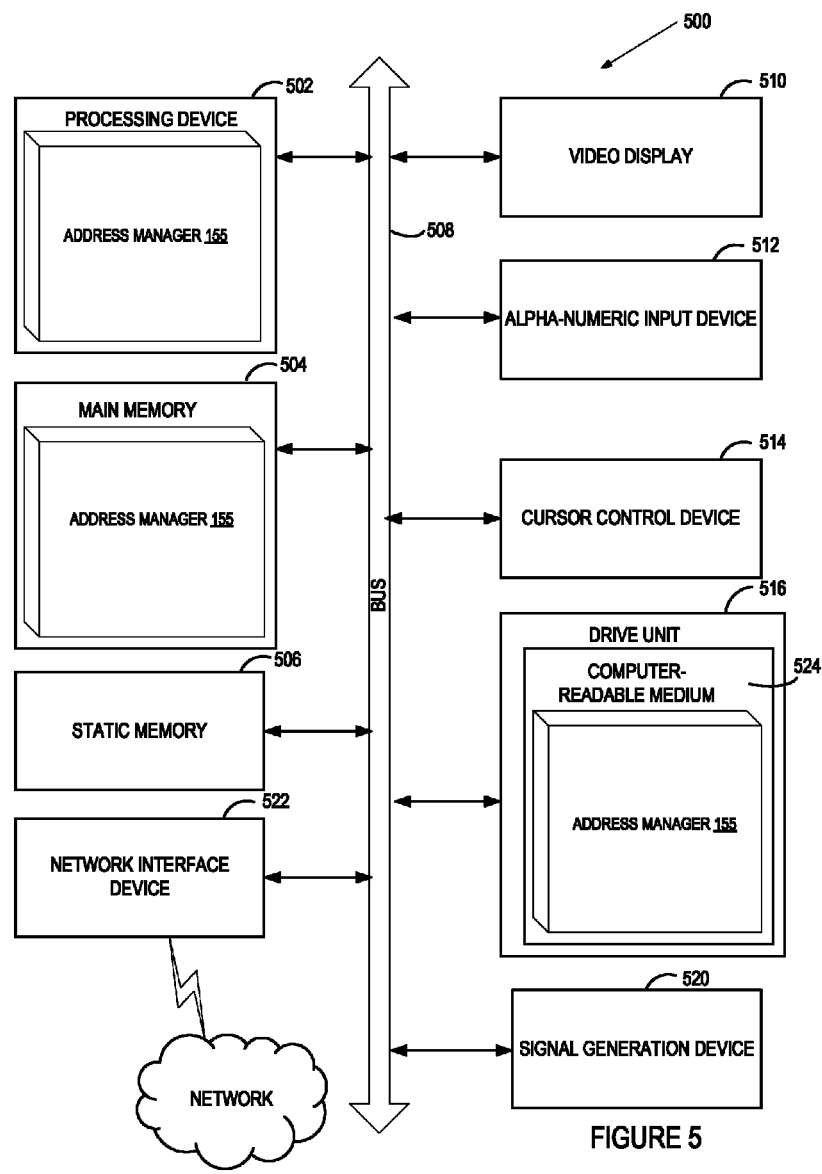
FIG. 5 illustrates a diagrammatic representation of an exemplary hypervisor migration management system.

FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The address manager 155 in FIG. 1 may comprise processing device 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the address manager 155) embodying any one or more of the methodologies or functions described herein. The instructions of the address manager 155 may also reside, completely or at least partially, within the main memory 504 and/or within the processing device 502 during execution thereof by the computer system 500, the main memory 504 and the processing device 502 also constituting computer-readable media. The instructions of the address manager 155 may further be transmitted or received over a network via the network interface device 522.

While the computer-readable storage medium 524 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "providing", "storing", "performing", "establishing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    maintaining a reference table comprising a first set of entries relating to a first plurality of performance sensitive devices and a second set of entries relating to a second plurality of non-performance sensitive devices, wherein each of the first set of entries and the second set of entries comprises a devices identifier, a device address, and an address hint, and wherein the first set of entries comprise address hints represented by index values, and wherein the second set of entries comprise address hints represented by non-index values;
    receiving, by a processing devices executing a hypervisor from a guest, a first request for access to a devices, wherein the first request comprises a devices address;
    retrieving, from the reference table, and address hint represented by an index value associated with the device, wherein the device is identified as a performance sensitive device;
    transmitting, by the processing device, the address hint associated with the performance sensitive device to the guest;
    receiving, from the guest, a second request for access to the performance sensitive device, wherein the second request comprises the address hint;
    performing a first look-up in the reference table in view of the address hint represented by the index value to identify the performance sensitive device; and
    establishing, by the processing devices, access to the performance sensitive device in view of identifying the performance sensitive device in the first look-up.

2. The method of claim 1, further comprising:
    in response to a failure of the first look-up, performance a second look-up in the reference table in view of the device address to identify the performance sensitive device, wherein the device address is provided with the second request.

3. The method of claim 1, further comprising discarding the reference table during migration of the guest from the hypervisor to a new hypervisor.

4. The method of claim 2, further comprising verifying the device address provided with the second request matches the device address associated with the address hint in the reference table.

5. The method of claim 1, further comprising:
transmitting, by the processing device, and updated address hint associated with the performance sensitive device to the guest in response to the second request;
receiving, by the processing device from the guest, a third request for access to the performance sensitive device, wherein the third request comprises the updated address hint;
performing a third look-up in the reference table in view of the updated address hint to identify the performance sensitive device; and
establishing, by the processing device, access to the device in view of identifying the performance sensitive device in the third look-up.

6. The method of claim 1, wherein the performance sensitive device comprises a high-speed device.

7. The method of claim 1, wherein at least one of the non-performance sensitive devices comprises a low-speed device.

8. The method of claim 1, further comprising storing the reference table prior to receiving the first request for access to the device.

9. The method of claim 1, further comprising:
generating, by the processing device, in response to receiving the first request for access, the address hint associated with the performance sensitive device; and
storing, by the processing device, an associated between the address hint and the performance sensitive device in the reference table.

10. A non-transitory computer readable storage medium comprising instructions that, upon executed by a processing device, cause the processing device to:
maintain a reference table comprising a first set of entries relating to a first plurality of performance sensitive devices and a second set of entries relating to a second plurality of non-performance related devices, wherein each of the first set of entries and the second set of entries comprises a device identifier, a device address, and an address hint, and wherein the first set of entries comprise address hints represented by index values, and wherein the second set of entries comprise address hints represented by non-index values;
receive, by the processing device executing a hypervisor from a guest, a first request for access to a device, wherein the first request comprises a device address;
retrieve, from the reference table, an address hint represented by an index value associated with the device, wherein the device is identified as a performance sensitive device;
transmit, by the processing device, the address hint associated with the performance sensitive device to the guest;
receive, from the guest, a second request for access to the performance sensitive device, wherein the second request comprises the address hint;
perform a first look-up in the reference table in view of the address hint represented by the index value to identify the performance sensitive device; and
establish, by the processing device access to the performance sensitive device in view of identifying the performance sensitive device in the first look-up.

11. The non-transitory computer readable storage medium of claim 10, the processing device to:
in response to a failure of the look-up, perform a second look-up in the reference table in view of the device address to identify the performance sensitive device, wherein the device address is provided with the second request.

12. The non-transitory computer readable storage medium of claim 10, the processing device to discard the reference table during migration of the guest from the hypervisor to a new hypervisor.

13. The non-transitory computer readable storage medium of claim 11, the processing device to verify the device address provided with the second request matches the device address associated with the address hint in the reference table.

14. The non-transitory computer readable storage medium of claim 10, the processing device to:
transmit, by the hypervisor, an updated address hint associated with the performance sensitive device to the guest in response to the second request;
receive, from the guest, a third request for access to the performance sensitive device, wherein the third request comprises the updated address hint;
perform a third look-up in the reference table in view of the updated address hint to identify the performance sensitive device; and
establish, by the hypervisor, access to the device in view of identifying the performance sensitive device in the third look-up.

15. The non-transitory computer readable storage medium of claim 10, wherein the performance sensitive device comprises a high-speed device.

16. The non-transitory computer readable storage medium of claim 10, wherein at least one of the non-performance sensitive devices comprises a low speed device.

17. The non-transitory computer readable storage medium of claim 10, the processing device to store the reference table prior to receiving the first request for access to the device.

18. The non-transitory computer readable storage medium of claim 10, the processing device to:
generated, by the hypervisor, in response to receiving the first request for the access, the address hint associated with the performance sensitive device; and
store, by the hypervisor, an association between the address hint and the performance sensitive device in the reference table.

19. A computer system comprising:
a memory to store a reference table; and
a processing device, operatively coupled to the memory, the processing device to execute a hypervisor to:
maintain the reference table comprising a first set of entries relating to a first plurality of performance sensitive devices and a second set of entries relating to a second plurality of non-performance related devices, wherein each of the first set of entries and the second set of entries comprises a device identifier, a device address, and an address hint, and wherein the first set of entries comprise address hints represented by index values, and wherein the second set of entries comprise address hints represented by non-index values;

receive, by the processing device executing a hypervisor from a guest, a first request for access to a device, wherein the first request comprises a device address;

retrieve, from the reference table, an address hint represented by an index value associated with the device, wherein the device is identified as a performance sensitive device;

transmit, by the processing device, the address hint associated with the performance sensitive device to the guest;

receive, from the guest, a second request for access to the performance sensitive device, wherein the second request comprises the address hint;

perform a first look-up in the reference table in view of the address hint represented by the index value to identify the performance sensitive device; and establish, by the processing device access to the performance sensitive device in view of identifying the performance sensitive device in the first look-up.

20. The computer system of claim 19, the processing device to:

in response to a failure of the first look-up, perform a second look-up in the reference table in view of the device address to identify the performance sensitive device, wherein the device address is provided with the second request.

21. The computer system of claim 19, the processing device to discard the reference table during migration of the guest from the hypervisor to a new hypervisor.

22. The computer system of claim 19, the processing to verify the device address provided with the second request matches the device address associated with the address hint in the reference table.

23. The computer system of claim 19, the processing device to:

transmit an updated address hint associated with the performance sensitive device to the guest in response to the second request;

receive, from the guest, a third request for access to the performance sensitive device, wherein the third request comprises the updated address hint;

perform a third look-up in the reference table based on the updated address hint to identify the performance sensitive device; and establish access to the device by the guest when the performance sensitive device is identified in view of the third look-up.

24. The computer system of claim 19, wherein the performance sensitive device comprises a high-speed device.

25. The computer system of claim 19, wherein at least one of the non-performance sensitive devices comprises a low-speed device.

26. The computer system of claim 19, the processing device to store the reference table prior to receiving the first request for access to the device.

27. The computer system of claim 19, the processing device to:

generate in response to receiving the first request for access, the address hint associated with the performance sensitive device; and store an association between the address hint and the performance sensitive device in the reference table.

* * * * *